United States Patent
Weng (10) Patent No.: US 12,456,912 B2
(45) Date of Patent: Oct. 28, 2025

(54) FORWARD DC-DC ZVS CONVERTER AND CONTROL SCHEME

(71) Applicant: Da Feng Weng, Sunnyvale, CA (US)

(72) Inventor: Da Feng Weng, Sunnyvale, CA (US)

(73) Assignee: Da Feng Weng, Sunnyvale, CA (US)

( * ) Notice: Subject to any disclaimer, the term of this patent is extended or adjusted under 35 U.S.C. 154(b) by 481 days.

(21) Appl. No.: 17/300,765

(22) Filed: Oct. 29, 2021

(65) Prior Publication Data

US 2023/0140308 A1    May 4, 2023

(51) Int. Cl.
*H02M 1/00*    (2007.01)
*H02M 3/335*    (2006.01)
*H05B 45/382*    (2020.01)

(52) U.S. Cl.
CPC ..... *H02M 1/0058* (2021.05); *H02M 3/33553* (2013.01); *H05B 45/382* (2020.01)

(58) Field of Classification Search
CPC ............ H02M 1/0058; H02M 3/33553; H05B 45/382
See application file for complete search history.

(56) References Cited

U.S. PATENT DOCUMENTS

| | | | | |
|---|---|---|---|---|
| 5,831,838 A | * | 11/1998 | Illingworth | H02M 3/33507 363/21.03 |
| 2005/0099827 A1 | * | 5/2005 | Sase | H02M 3/33571 363/16 |
| 2012/0314452 A1 | * | 12/2012 | Schwander | H02M 3/33553 363/16 |

* cited by examiner

*Primary Examiner* — Jue Zhang (57) ABSTRACT

The proposed solution allows a forward DC-DC converter's isolated transformer to resonant reset and the forward DC-DC converter to operate in ZVS condition regardless of whether the output inductor current is in DCM or CCM. To compare with a regular forward DC-DC converter, the output isolated transformer has an extra reset winding Nt in addition to the regular primary and secondary windings Np and Ns. Based on the rule of the magnetic flux remaining unchanged for the forward output isolated transformer, it is the extra reset winding Nt, a resonant capacitor Cr, an additional MOS Q2 and the related control function block M that allow the forward output isolated transformer to finish resonant reset and the primary main power MOS Q1 to operate in ZVS. The magnetizing current of the forward output isolated transformer is fully utilized, and regardless of whether the resonant reset circuit is on the primary or the secondary, the magnetizing current can enable the forward output isolated transformer to resonant reset and serve as the main power MOS Q1 operation in ZVS.

5 Claims, 5 Drawing Sheets

FORWARD DC-DC ZVS CONVERTER AND CONTROL SCHEME

BACKGROUND OF THE INVENTION

Due to the output voltage of flyback DC-DC converters, the output isolated transformer can reset itself automatically. This is not the case for forward DC-DC converters since they do not have an auto-reset function and need an extra circuit to finish the reset for the forward output isolated transformer. So far there are a couple reset methods to help the forward output isolated transformer reset, e.g. RDC circuit, reset winding, active clamping reset and resonant reset. The active clamping reset and resonant reset can allow the forward output isolated transformer to operate in first and third quadrants. It is good to shrink the size of the forward output isolated transformer.

Figure 1:
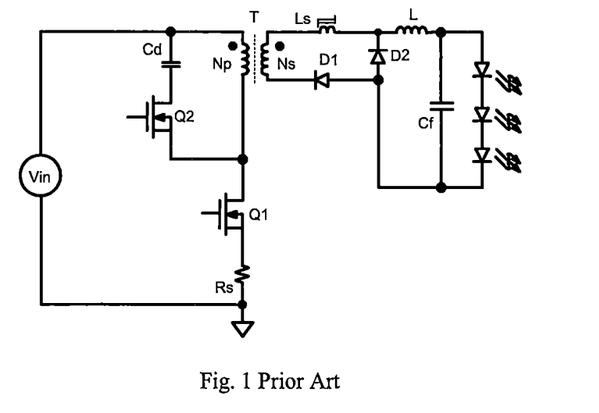
FIG. 1 is a schematic for the existed active clamping reset circuit

The active clamping reset (as shown in FIG. 1) can allow the forward converter to operate in ZVS condition to decrease switching loss. In the active clamping reset method, the active clamping reset voltage is composed of an active switch and a big capacitor. The steady state voltage on the big capacitor is determined by the duty-cycle and the input DC voltage. Due to no step change on the capacitor voltage, the voltage on the big capacitor will change slowly. It limits active clamping reset method in application with fast change in duty-cycle and the input DC voltage.

Figure 2:
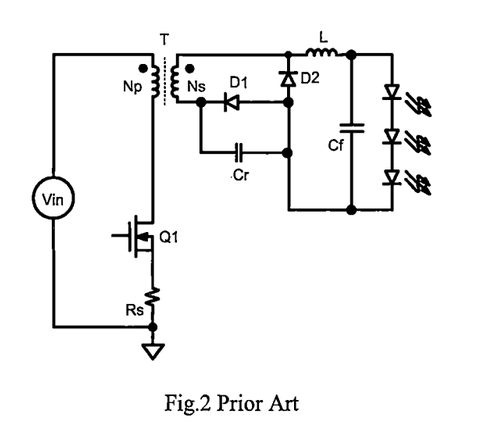
FIG. 2 is a schematic of the existed resonant reset circuit for the output inductor L current in CCM condition.

In CCM operating condition, the resonant reset method (as shown in FIG. 2) can be implemented with a low value resonant capacitor Cr parallel with the output diode D1. It can finish the forward output isolated transformer resonant reset with freewheel diode D2 turned on. During the resonant reset time slot of the forward output isolated transformer, the voltage on the resonant capacitor Cr will change from zero to peak and from peak to zero. This is due to the low value resonant capacitor Cr. The resonant reset time is determined with the value of the resonant capacitor Cr and the magnetizing inductor Lm of the forward output isolated transformer. As the values of the resonant capacitor Cr and the magnetizing inductor Lm of the forward output isolated transformer are fixed, the resonant reset time is fixed. The peak voltage of resonant reset is related with the duty-cycle and the input DC voltage. It will not bring extra turn-on switching loss on the primary side MOSFET as the low value resonant capacitor is parallel with the output diode D1 on the secondary side of the forward output isolated transformer. Under the CCM operating condition, the magnetizing current will be much smaller than the output inductor current. Therefore, as the freewheel diode D2 turns on, the low value resonant capacitor Cr will be parallel with the secondary winding of the forward output isolated transformer through the freewheel diode D2 to finish resonant reset operation. The voltage on the low value resonant capacitor Cr will then change from zero to peak and from peak to zero.

In the DCM operation condition, if the output inductor current's freewheel time is less than the resonant reset time, the forward output isolated transformer will not finish the resonant reset completely due to the freewheel diode D2 turn-off. As the forward DC-DC converter is designed for wide range output current application, the forward DC-DC converter will operate in DCM. Consequently, it is currently impossible to ensure that the forward output isolated transformer can be resonant reset with this kind of resonant reset circuit.

SUMMARY OF THE INVENTION

The invention provides a solution to enable the forward DC-DC converter's output isolated transformer to resonant reset and the forward DC-DC converter to operate in ZVS condition regardless of whether the output inductor L current in DCM or CCM. In comparison with a regular forward DC-DC converter, the output isolated transformer has an extra reset winding Nt besides with regular primary and secondary windings Np and Ns. Based on the rule of the magnetic flux unchanged of the forward output isolated transformer, it is the extra reset winding, an additional MOS Q2 and the related control function block M that causes the forward output isolated transformer to finish resonant reset and allows the primary main power MOS Q1 to operate in ZVS. In the invention, the magnetizing current of the forward output isolated transformer is fully utilized to allow the forward output isolated transformer resonant reset and the primary power MOS Q1 operation in ZVS.

The invention creates a number of significant improvements to the current state, which include:

1. Regardless of whether the output inductor L current is in CCM or DCM, the forward output isolated transformer can be resonant reset.
2. Regardless of whether output inductor current is in CCM or DCM, the primary side MOS Q1 can be turned on in ZVS condition and down switching loss.
3. Due to the resonant capacitor's voltage from zero to peak and from peak to zero during resonant reset, the resonant capacitor memory is no longer impacted. This enables the whole system to be more stable, simple, compensable and have wider bandwidth.
4. Due to the fixed resonant rest time, the constant off time control scheme is used. The duty-cycle of the primary MOS Q1 can be over 0.5. This allows for wider input DC application.
5. Due to the fixed resonant rest time and with constant off time control, the switching frequency of the primary side MOS Q1 is available with input and output voltage and current. It is good to overcome EMI issues.
6. The invention allows for the magnetizing current of the forward output isolated transformer to change from both negative to positive and positive to negative. The forward output isolated transformer can operate in both first and third quadrants. It is beneficial to have the ability to shrink the size of the forward output isolated transformer.

DETAILED DESCRIPTION OF THE INVENTION

The invention enables forward DC-DC isolated output transformer resonant resets and the primary side MOS Q1 turn-on in ZVS condition to decrease switching loss, regardless of whether the output inductor's current is in both DCM or CCM. Since there are multiple possibilities including DCM or CCM output inductor currents as well as resonant reset circuits on either the primary or secondary side, the following four technical schemes provide further details on how the invention applies in various scenarios.

Technical scheme 1: The resonant reset circuit is on the primary side of the forward DC-DC converter, and the output inductor current is in DCM condition.

Figure 3:
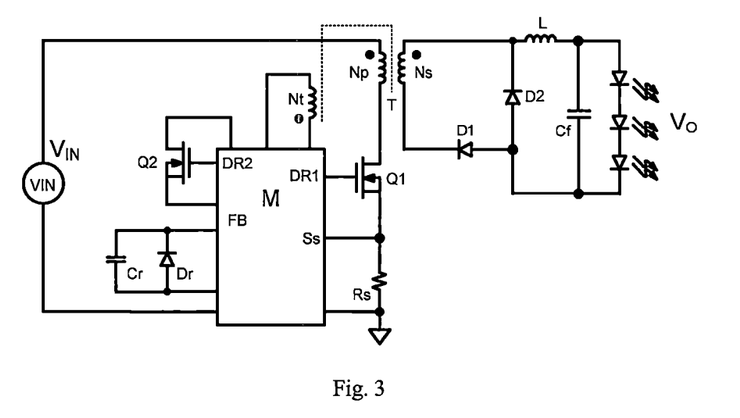
FIG. 3 is a schematic of the invention for the output inductor L current in DCM condition. The function block M and the related resonant reset circuit are on the primary side of the isolated transformer.

FIG. 3 is the invention schematic for the output inductor current in DCM condition. To compare with regular forward DC-DC converter, the output isolated transformer has primary and secondary windings Np and Ns, as well as an extra reset winding Nt. The extra reset winding Nt can be treated the same as the regular reset winding.

All devices connection relation is as following in detail: the output isolated transformer has primary winding Np, secondary winding Ns and reset winding Nt in tight couple through a magnetizing core. The output isolated transformer has a magnetizing inductor Lm, and it can be seen from the primary winding Np, the secondary winding Ns and reset winding Nt. The related magnetizing inductor Lm value is changed with turns-ratio square from Np, Ns and Nt. Two terminals of the secondary winding Ns are connected with the cathodes of the output diode D1 and the freewheel diode D2 separately. The anodes of the output diode D1 and the freewheel diode D2 are connected together with negative terminals of output filter capacitor Cf and the load. The cathode of the freewheel diode D2 is connected with the one terminal of the output inductor L, and the other terminal of the output inductor L is connected with the positive terminal of output filter capacitor Cf and the load.

The function block M can be divided as two parts. One is to control the primary MOS Q1 on and off switch. The other is to control resonant reset MOS Q2 on and off switch based on the input provided by the resonant reset voltage or current. The function block M's pin DR1 is connected to the primary MOS Q1's gate. The function block M's pin Ss is connected with the primary MOS Q1's source. The primary MOS Q1's source is through the sense resistor Rs into ground. The drain and source of MOS Q2, the reset winding Nt and the resonant capacitor Cr with parallel diode Dr are connected with related pins of the function block M. The detailed connection between the drain and source of MOS Q2, the reset winding Nt and the resonant capacitor Cr will be presented in following embodiments. The function block M's pin DR2 is connected with the MOS Q2's gate. Based on the reset winding Nt current $I_{RC}$ or the resonant capacitor voltage Vcr, the function block M will control the resonant reset through MOS Q2 turn-on or off. $V_{IN}$ is the primary side input DC voltage. $V_{IN}$ is connected with the primary winding's homonymous end of the output isolated transformer. The primary winding's non-homonymous end is connected with the drain of MOS Q1.

Based on the resonant reset current $I_{RC}$ or voltage Vcr, the function block M controls MOS Q2's on and off switch to enable the output isolated transformer to finish the resonant reset and make the primary side MOS Q1 turn on in ZVS condition to decrease switching loss.

As MOS Q1 turns off and MOS Q2 turns on, the resonant capacitor Cr is reflected into the primary winding Np of the output isolated transformer through the reset winding Nt. The resonant capacitor Cr resonates with the magnetizing inductor Lm of the primary winding Np. As the resonant reset finishes, the current through the reset winding Nt is changed from negative maximum into positive maximum. As the function block M controls MOS Q2 turn off, the current in the reset winding Nt is transferred into the primary winding Np as negative magnetizing current. As long as the absolute magnetizing current is high enough, the magnetizing current will discharge the primary MOS Q1's drain-source capacitor voltage from the input DC voltage $V_{IN}$ into zero and cause the primary MOS Q1's body diode to turn on to feedback the magnetizing energy back to the input DC voltage $V_{IN}$. At this moment, the function block M controls the primary MOS Q1 turn-on. Because the primary MOS Q1's body diode turn-on is first, the primary MOS Q1 is turned on in ZVS condition with less switching loss.

The primary negative magnetizing current needs to be higher than the reflected current of the output inductor current as a condition for the primary MOS Q1 turn-on in ZVS; otherwise, the primary MOS Q1 can not turn on in ZVS. It is clear that the minimum magnetizing current for the primary MOS Q1 turn-on in ZVS condition relates to the output inductor current in DCM. With the output inductor current in DCM, the reflected current of the output inductor current is zero as the primary MOS Q1 begins turn-on; the required magnetizing current is the lowest for the primary MOS Q1 turn-on in ZVS. This is the reason why in FIG. 3 circuit, the output inductor L current is in DCM.

In one switching cycle of the forward DC-DC converter operation in DCM condition, it can be described as following:

The function block M controls the forward DC-DC converter resonant reset and the MOS Q1's operation in ZVS switching with MOS Q2, the resonant capacitor Cr, the resonant freewheel diode Dr, windings Np, Ns, Nt, the magnetizing inductor Lm of the output isolated transformer. If the initial time is t0, MOS Q1's body diode turns-on and the voltage on MOS Q1's drain-source is zero.

t0~t1: The negative magnetizing current passes through Q1's body diode, the sense resistor Rs and the primary winding Np to feedback the magnetizing energy back to the input voltage $V_{IN}$. The voltage on sense resistor Rs is negative. Both MOS Q1's drain current and the magnetizing current will increase from negative into positive in a linear progression (as shown $I_{RS}$ and $I_{Lm}$ waveforms in FIG. 4). The voltage on the sense resistor Rs gives feedback to the function block M. Based on the current mode control scheme, as the voltage on the sense resistor Rs is cross over the preset control level, it is t1 and the driving pulse from pin DR1 of the function block M is dismiss; MOS Q1 turns off. t~t1 slot is related with MOS Q1 turn-on time in this function: τ=t1−t0.

t1~t2: As MOS Q1 turns off, the drain-source voltage of MOS Q1 increases rapidly. The voltage on the primary winding Np is decreased from the input DC voltage to zero and reversed. The voltage on the secondary winding Ns is also decreased to zero and reversed. The output diode D1 turns off and the current in the output inductor L keeps to output to the load through the freewheel diode D2. The output load voltage is Vo. The magnetizing current of the primary winding Np is transferred to the reset winding Nt. The input magnetizing current through the homonymous end of the reset winding Nt is resonated with the resonant capacitor Cr through MOS Q2's body diode. The initial value of the input magnetizing current through the homonymous end of the reset winding Nt is Np/Nt times the primary winding Np magnetizing current as MOS Q1 turns off. The input magnetizing current through the homonymous end of the reset winding Nt is decreased from the initial value to zero (as shown $I_{RC}$ in FIG. 4) and the voltage on the resonant capacitor Cr is increased from zero to peak. Based on the resonant current or voltage, the function block M's pin DR2 outputs a driving pulse to the gate of MOS Q2 and MOS Q2 turns on. Due to MOS Q2's body diode first turn-on, MOS Q2 turns on in ZVS condition. As the resonant current is decreased to zero and the voltage on the resonant capacitor reaches its peak (as shown $V_{Cr}$ in FIG. 4), the time is t2.

t2~t3: Due to the driving pulse from the pin DR2 of the function block M to the gate of MOS Q2, MOS Q2 is kept on. The resonant capacitor Cr continues to resonate with the magnetizing inductor Lm of the primary winding Np through MOS Q2 and the reset winding Nt. The magnetizing current in the reset winding Nt is increased from zero to peak (as shown $I_{RC}$ in FIG. 4) and the voltage on the resonant capacitor Cr is decreased to zero (as shown $V_{Cr}$ in FIG. 4) at t3. The voltage on the primary winding is zero. The voltage of MOS Q1's drain-source is decreased from over the input DC $V_{IN}$ into the input DC $V_{IN}$.

Figure 4:
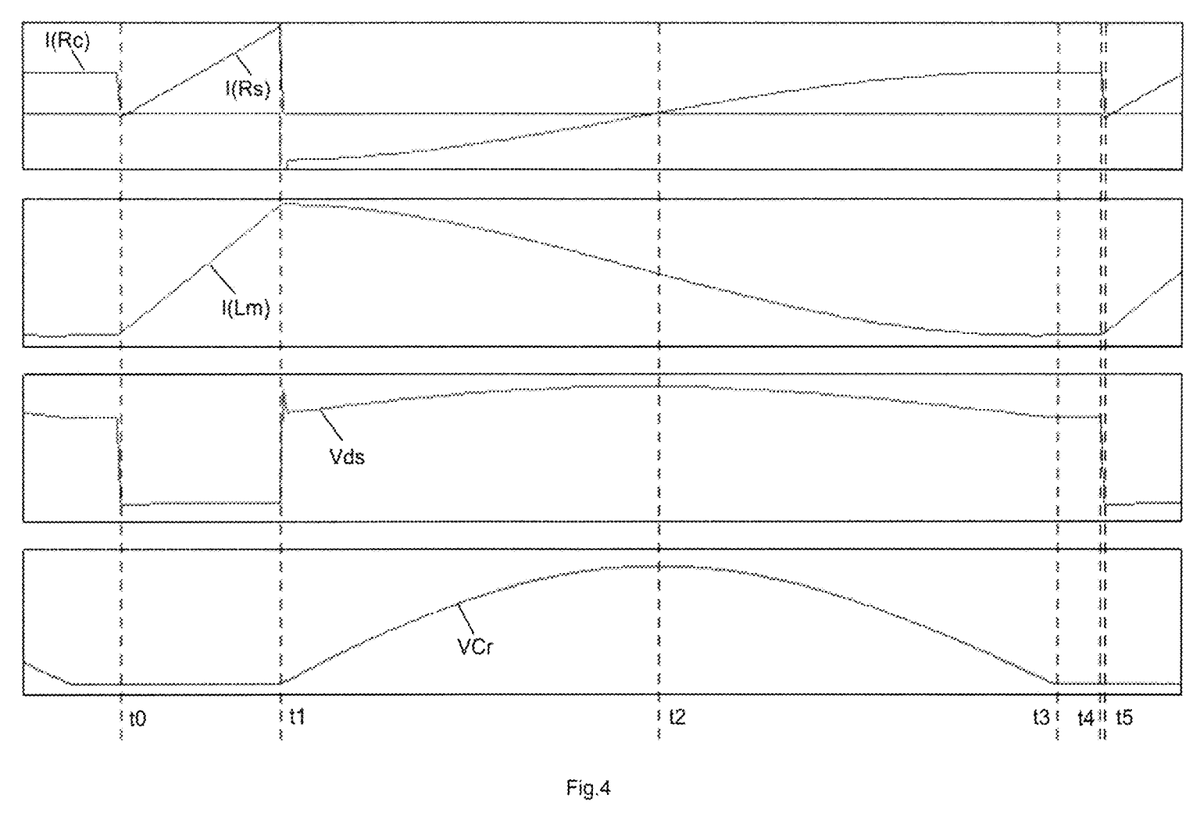
FIG. 4 is waveforms for key voltages and currents in the invention circuit

During the time slot of t1~t3, the output isolated transformer is resonant reset and it is finished at t3, by this function: $T_{RESET}$=t3−t1

$$T_{RESET} = \pi \cdot \sqrt{L_m \cdot C_r} \quad (1)$$

$$U_{Cr\_Peak} = \frac{\pi \cdot \tau \cdot V_{IN}}{2 \cdot T_{RESET}} \quad (2)$$

In the formula (1), the resonant reset time is only determined with the magnetizing inductor Lm and the resonant capacitor Cr. In the formula (2), the peak voltage of the resonant capacitor Cr is determined by the voltage-second product of the primary MOS Q1's turn-on time and the voltage on the primary winding divided by the resonant reset time $T_{RESET}$. In order to make sure that the output isolated transformer finishes resonant reset, the turn-off time of the primary MOS Q1 in the forward DC-DC converter must be longer than the resonant reset time $T_{RESET}$.

t3~t4: In the t3~t4 time slot, MOS Q2 stays on. The diode Dr parallel with the resonant capacitor Cr is turned on, and the voltages on the resonant capacitor and the reset winding Nt keep zero (as shown $V_{Cr}$ waveform in FIG. 4). Due to zero voltage on the reset winding Nt, the current in the reset winding keeps constant (as shown $I_{RC}$ waveform in FIG. 4) and the drain-source voltage of the MOS Q1 is equal to the input DC voltage Vin (as shown Vds waveform in FIG. 4).

All of these are prepared to make MOS Q1 turn-on in ZVS. This time slot provides a regulated freedom to allow the output current to maintain a wide output regulated range. As the forward DC-DC converter operates in DCM, the current of the output inductor L will decay to zero before t4.

t4~t5: At moment t4, the output DR2 of function block M steps down to zero. MOS Q2 turns off and the magnetizing current in the reset winding Nt drops to zero suddenly. Due to the magnetic flux unchanged of the output isolated transformer, the magnetizing current in the reset winding Nt must go out through other windings. For the secondary winding Ns, due to DCM, the current in the output inductor L is zero and can not step up instantaneously. The magnetizing current in the reset winding Nt can not go out through the secondary winding Ns. For the primary winding Np, it is connected with the input voltage $V_{IN}$ through the primary MOS Q1. The magnetizing current in the reset winding Nt can go back to the input voltage $V_{IN}$ through the primary winding Np. The magnetizing current in the reset winding Nt through the homonymous end of the primary winding Np is Nt/Np times the reset winding Nt magnetizing current as MOS Q2 turns off. It is the current out from the homonymous end of the primary winding Np that makes the drain voltage of the primary MOS Q1 to drop from the input voltage $V_{IN}$ to zero and MOS Q1's body diode turn on (as shown $I_{RS}$ waveform in FIG. 4). The magnetizing current in the reset winding Nt feedbacks to the input voltage $V_{IN}$ through the primary winding Np. It is moment t5 when the voltage on the primary MOS Q1 is zero and the drain current of the primary MOS Q1 is negative.

If at moment t5, the output DR1 of the function block M will step up to a high level for the gate of the primary MOS Q1, and the primary MOS Q1 is turned on in ZVS condition. Of cause, The condition to make the primary MOS Q1 turn-on in ZVS is that the reflected current in the primary winding Np for the peak magnetizing current in the reset winding Nt is high enough to discharge the drain capacitance voltage of the primary MOS Q1 to zero and the body diode of the primary MOS Q1 turn-on to feedback the magnetizing current back to the input voltage $V_{IN}$. The peak magnetizing current is determined with the magnetizing inductor Lm value and the voltage-second product of primary MOS Q1 turn-on time T with the input voltage $V_{IN}$. It needs to select a suitable magnetizing inductor Lm value to guarantee that the reflected peak current in the primary winding is high enough to discharge the drain capacitance voltage of the primary MOS Q1 to zero and the body diode of the primary MOS Q1 turn-on to feedback the magnetizing current back to the input voltage $V_{IN}$.

The MOS Q1's turn-off time $T_{OFF}$ in the primary of the output isolated transformer will be from t1 to t5. The output isolated transformer reset time $T_{RESET}$ is determined with the magnetizing inductor Lm of the output isolated transformer and the resonant capacitor Cr. Due to the fixed reset time $T_{RESET}$, the forward DC-DC converter should be controlled with the constant turn-off time control. The constant turn-off time $T_{CONST-OFF}$ should be over or equal to the output isolated transformer reset time $T_{RESET}$, that is, $T_{CONST-OFF}$>$T_{RESET}$. Due to the forward DC-DC converter controlled with the constant turn-off control, the peak current mode constant turn-off time control can be used to control the primary MOS Q1 of the forward DC-DC converter. With the control scheme, the switching frequency of the forward DC-DC converter is varied with the output current, the input and output voltages. The spectrum of the switching frequency is a continuous spectrum. It is easy to decrease EMI design.

With the constant turn-off time $T_{CONST-OFF}$ control, the output isolated transformer has finished resonant reset, that means, in the reset time $T_{RESET}$, the voltage on the resonant capacitor Cr is changed from zero to the peak and from the peak to zero. After the reset time $T_{RESET}$, the voltage on the resonant capacitor has no change and is zero (as shown $V_{Cr}$ waveform in FIG. 4). The voltage on the resonant capacitor Cr has no relation with the input voltage, the primary MOS Q1's turn-on time τ and the output current. It quietly simplifies any complications of the control system, and it is easy to compensation for system. The system is in stable and the regulated bandwidth is in wide.

For the forward DC-DC converter, with the peak current mode constant turn-off time control, the primary MOS Q1's turn-on duty-cycle can be changed in wide range, that is, over 0.5. It can make the forward DC-DC converter work in wide input voltage range. Due to the forward DC-DC converter, as the primary MOS Q1 turns on, the input voltage $V_{IN}$ applies to the primary winding Np of the output isolated transformer, the secondary winding Ns, the output diode D1 and the output inductor L to the output load in proper sequence. As the primary MOS Q1 turns off, the current in the output inductor L keeps to outputs to the load through the freewheel diode D2. The peak current in the output diode D1 and the freewheel diode D2 does not increase with the input voltage decrease. Only the primary MOS Q1's turn-on time T is increased, and the switching frequency of the forward DC-DC converter is decreased, vice versa.

As the forward DC-DC converter is in DCM, the current in the output inductor L is a series of triangle pulse. For each triangle pulse current, the current increases from zero to the peak in the step up slope ku for the primary MOS Q1's turn-on time τ; and the current decreases from the peak to zero in the step down slope kd as the output voltage Vo is constant during the primary MOS Q1 turn-off time $T_{OFF}$.

As the forward DC-DC converter is in critical DCM, the output load current Io is the half of the peak current $I_{PEAK}$ of the output inductor L. It only needs to regulate the peak current $I_{PEAK}$ of the output inductor L to regulate the output load current Io. With the peak current $I_{PEAK}$ of the output inductor L decrease, the turn-on time τ of the primary MOS Q1 decreases; the time of duration for the output inductor's current over zero is decreased; the forward DC-DC converter will be completely in DCM; and the switching frequency of the forward DC-DC converter is increased. The switching cycle Ts is: Ts=τ+$T_{CONST-OFF}$. With the dead time between two triangle pulse current increase, that is, t3~t4 time slot, the output load current Io is decreased. Due to fixed $T_{CONST-OFF}$, the longer the dead time and the lower the output load current; and the switching frequency of the forward DC-DC converter doesn't increase.

$$k_u = \frac{\frac{N_S}{N_P} \cdot V_{IN} - V_O}{L} \quad (3)$$

$$k_d = \frac{V_O}{L} \quad (4)$$

$$I_O = \frac{I_{PEAK}}{2} \quad (5)$$

Based on the resonant current or voltage for the resonant reset, the function block M's DR2 pin outputs the driving voltage for the gate of MOS Q2, and the drain current of MOS Q2 is related with the resonant current (as shown $I_{RC}$ waveform in FIG. 4). Due to feedback current or voltage from the resonant reset circuit, there are couple implement schemes to make the function block M to output DR2 driving voltage for the gate of MOS Q2.

Technical Scheme 1: for the resonant reset circuit on the primary of a forward DC-DC converter, and the output inductor current in DCM, there are two embodiments (embodiment 1 and embodiment 2).

Embodiment 1

Figure 5:
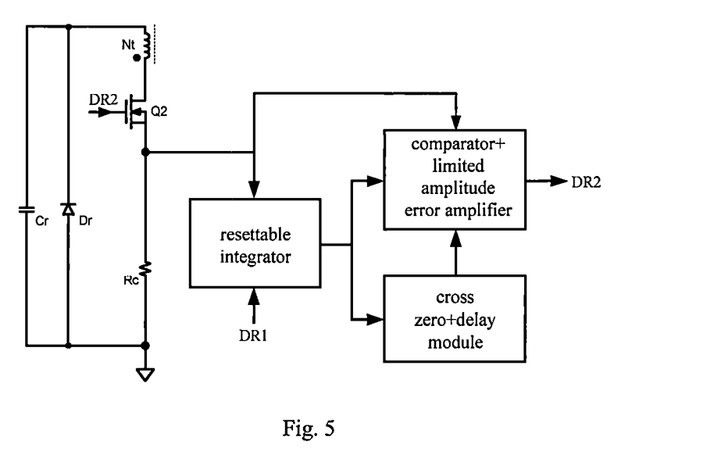
FIG. 5 is a function block of embodiment 1 for MOS Q2's control block diagram on the primary side of the output isolated transformer.

In the function block M, the block diagram shows the connection between the sense resistor Rc and MOS Q2 in FIG. 5. In the function block M, there are a resettable integrator, a comparator+limited amplitude error amplifier, a cross zero+delay module. MOS Q2's source is connected to ground through a sense resistor Rc. The homonymous end of the reset winding Nt is connected with the drain of MOS Q2. The non-homonymous end of the reset winding Nt is connected to ground through a resonant capacitor Cr. A diode Dr is parallel with the resonant capacitor Cr, and the anode of the diode Dr is connected with ground. The output of the comparator+limited amplitude error amplifier module is DR2 and connected with the gate of MOS Q2.

The sense voltage on the sense resistor Rc serves as input signals for the resettable integrator and the comparator+limited amplitude error amplifier module. The output of the resettable integrator acts as inputs for the comparator+limited amplitude error amplifier and the cross zero+delay module. The output of the cross zero+delay module is the third input of the comparator+limited amplitude error amplifier.

Under DCM condition, the magnetizing current change for one switching period is as following:

In t1~t2 time slot, as MOS Q1 turns off, the resonant capacitor Cr is parallel resonant with the primary winding Np through MOS Q2's body diode, the sense resistor Rc and the reset winding Nt. The magnetizing current is transferred from the primary winding Np into the reset winding Nt. The magnetizing current in the reset winding Nt is resonantly decreased to zero (as shown $I_{RC}$ waveform in FIG. 4), and the voltage on the resonant capacitor Cr is resonantly increased from zero to peak at t2. The negative voltage on the sense resistor Rc is related with the negative magnetizing current in the reset winding Nt. Based on the voltage on the sense resistor Rc, DR2 from the function block M is in high level for the gate of MOS Q2. MOS Q2 is turned on in ZVS due to MOS Q2's body diode turn-on first.

In t2~t3 time slot, MOS Q2 keeps on, and the resonant capacitor Cr continues to resonate with the primary winding Np through MOS Q2, the sense resistor Rc and reset winding Nt. The magnetizing current in the reset winding Nt is resonantly increased from zero to peak (as shown $I_{RC}$ waveform in FIG. 4), and the voltage on the resonant capacitor Cr is decreased from peak to zero at t3. The positive voltage on the sense resistor Rc is related with the positive magnetizing current in the reset winding Nt.

The voltage on the sense resistor Rc is integrated in the resettable integrator. As the voltage on the sense resistor is negative, the output voltage of the integrator is increased over time. The higher the absolute voltage on the sense resistor Rc, the faster the output voltage of the integrator increases and vice versa. As the voltage on the sense resistor Rc is positive, the output voltage of the integrator is decreased over time. The higher the absolute voltage on the sense resistor Rc, the faster the output voltage of the integrator decreases and vice versa. In this way, the resonant capacitor's voltage $V_{Cr}$ can be reconstituted through the resettable integrator. The reset signal for the resettable integrator is DR1 output pulse signal from the function block M.

The output voltage of the resettable integrator is used as inputs for the comparator+limited amplitude error amplifier and the cross zero+delay module. In the comparator+limited amplitude error amplifier, the input is compared with a preset reference level and amplified to generate a reference. The voltage on the sense resistor Rc with the reference is error amplified and output to control DR2's voltage level for the gate of MOS Q2 and make the drain current of MOS Q2 as shown $I_{RC}$ current waveform in FIG. 4.

Based on the output voltage of the resettable integrator, the cross+delay module tries to find the cross zero moment and start the preset delay time $\zeta$, that is, $\zeta$=t3~t4.

In t3~t4 time slot: Due to MOS Q2 turn-on, the resonant capacitor Cr continues resonating with the magnetizing inductor Lm through MOS Q2, Rc and the reset winding Nt. The parallel diode Dr with the resonant capacitor Cr is turned on. It makes the voltages on the resonant capacitor Cr and the reset winding Nt zero, and the magnetizing current in the reset winding Nt constant.

In t4~t5 time slot: After the delay time $\zeta$, the cross+delay module outputs turn-off signal to the comparator+limited-error amplifier module, and the function block M's DR2 outputs zero to turn off MOS Q2. As DR2 of the function block M drops to zero, $\zeta$1 time slot is started. The voltage on the sense resistor Rs is detected during $\zeta$1 time slot. If the voltage is negative, it means the body diode of the MOS Q1 turned on, and the DR1 of the function block M can be at a high enough level to turn on MOS Q1 in ZVS. If the voltage is over zero, it means that during t4~t5 time slot, the generated negative magnetizing current in winding Np due to MOS Q2 turn-off isn't high enough to discharge the drain capacitance voltage from the input voltage $V_{IN}$ drop to zero, and make the body diode of MOS Q1 turn-on. The voltage between the drain and source of the MOS Q1 is over zero. After $\zeta$1 time slot, the DR1 of the function block will be high level to turn on MOS Q1 in hard switching condition and the output isolated transformer has finished the resonant reset. The magnetizing current will increase from negative to positive linearly.

Preset delay time $\zeta$ is related with t3~t4 time slot. The delay time is adjustable. It gives extra freedom for the output current to regulate enabling a wider regulation range.

With the output current decrease, the magnetizing current of the forward DC-DC isolated output transformer is decreased too. During t4~t5 time slot, due to MOS Q2 turn-off, the magnetizing current in the primary winding Np isn't high enough to discharge the capacitor's voltage of MOS Q1's drain and source from the input voltage Vin to zero and the body diode of MOS Q1 turn-on. The drain voltage of MOS Q1 keeps over zero. After $\zeta$1 delay time, MOS Q1 is turned on in hard switching. The length of time for the output DR1 of the function block M in high level is determined with when the feedback voltage on the sense resistor Rs is equal to the preset voltage in the function block M.

Embodiment 2

Figure 6:
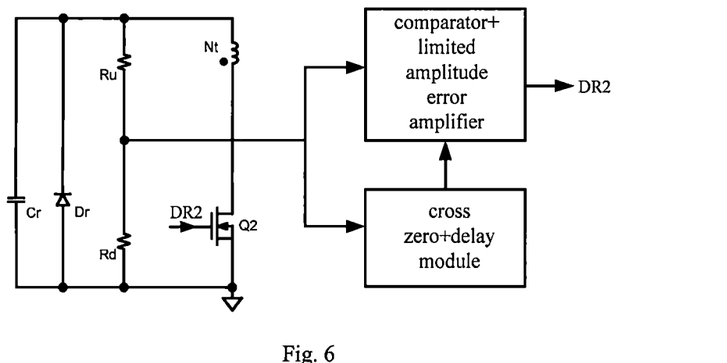
FIG. 6 is a function block of embodiment 2 for MOS Q2's control block diagram on the primary side of the output isolated transformer.

To compare with FIG. 5, in FIG. 6, the resettable integrator can be saved from the function block M. The function block M is composed of a compare+limited amplitude error amplifier and a zero cross+delay module. The source of MOS Q2 is in ground. The drain of MOS Q2 is connected with the homonymous end of the reset winding Nt. The non-homonymous end of the reset winding Nt is connected to ground through the resonant capacitor Cr. The diode Dr is parallel with the resonant capacitor Cr. The anode of the parallel diode Dr is in ground. The output of compare+limited amplitude error amplifier is connected with the gate of MOS Q2. The voltage on the resonant capacitor is outputted through a voltage divider network. The voltage divider is composed of Ru and Rd. The output of the voltage divider serves as input signals for the compare+limited amplitude error amplifier and the zero cross+delay module. The output of the zero cross+delay module is the second input for the compare+limited amplitude error amplifier.

Under DCM condition, during a switching cycle, the circuit's current and voltage change as follows:

The output voltage waveform from the voltage divider composed of Ru and Rd is similar with one on the resonant capacitor Cr. Based on the output voltage, in the function block M, the voltage is treated through the compare+limited amplitude error amplifier and outputted to control the gate of MOS Q2 and create the drain current in MOS Q2 as shown $I_{RC}$ current waveform in FIG. 4. It is the voltage divider's output voltage, similar with one on the resonant capacitor Cr, that allows the function block M to save the resettable integrator in Embodiment 1 for the resonant capacitor voltage reconstitution. The output from the voltage divider serves as input signals for both the compare+limited amplitude error amplifier and the zero cross+delay module. Based on the output from the voltage divider, the compare+limited amplitude error amplifier generates control voltage on the gate of MOS Q2 and creates the drain current of MOS Q2 as shown $I_{RC}$ waveform in FIG. 4. Based on the output from the voltage divider, the zero cross+delay modular figures out zero cross moment and starts the preset delay timer $\zeta$. After delay time $\zeta$, the zero cross+delay modular outputs turn-off signal to the compare+limited amplitude error amplifier and to make the output DR2 from the function block M to step down and to turn off MOS Q2.

In the function block M, as the output DR2 drops to zero, a delay timer $\zeta$1 is started to detect the voltage on the sense resistor Rs. As the voltage is negative during delay time $\zeta$1, it means the body diode of MOS Q1 turn-on and the DR1 from the function block M can be high to turn on MOS Q1 in ZVS; If the voltage is over zero during the delay time $\zeta$1, it means during the delay time $\zeta$1, due to MOS Q2 turn-off, the magnetizing current in the primary winding Np isn't high enough to discharge the capacitor's voltage of MOS Q1's drain and source from the input voltage Vin to zero and the body diode of MOS Q1 turn-on. The drain voltage of MOS Q1 keeps over zero. After $\zeta$1 delay time, MOS Q1 is turned on in hard switching, and the output isolated transformer has finished resonant reset.

Preset delay time $\zeta$ is related with t3~t4 time slot. The delay time $\zeta$ is adjustable. It gives extra freedom for the output current regulation in order to make sure the output current with wider regulation range. With the output current decrease, the related magnetizing current of the forward DC-DC output isolated transformer is also decreased. During the delay time $\zeta$1, due to MOS Q2 turn-off, the magnetizing current in the primary winding Np isn't high enough to discharge the drain voltage of MOS Q1 from the input voltage Vin to zero and the body diode of MOS Q1 turn-on. The drain voltage of MOS Q1 keeps over zero. After $\zeta$1 delay time, MOS Q1 is turned on in hard switching. The duration of the output DR1 in high is determined with when the feedback voltage on the sense resistor Rs reaches the preset voltage in the function block M.

Technical Scheme 2: the resonant reset circuit is on the primary of a forward DC-DC converter, and the output inductor current is in both DCM and CCM condition.

Embodiment 3

Figure 7:
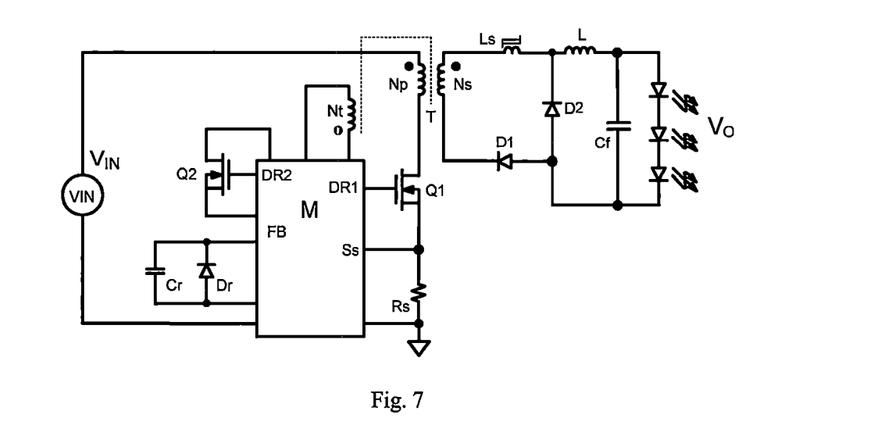
FIG. 7 is a schematic of embodiment 3 for the output inductor L current for both DCM and CCM conditions. The function block M and the related resonant reset circuit are on the primary side of the isolated transformer.

To compare with the technical scheme 1, it needs to add a device to make sure MOS Q1 turn-on in ZVS for the output inductor L current in both CCM and DCM condition. To compare with FIG. 3, it has an extra saturable inductor Ls on the secondary side as shown in FIG. 7. The saturable inductor Ls is inserted between the homonymous end of the secondary winding Ns and the cathode of the freewheel diode D2.

Under CCM condition for the forward DC-DC converter, as MOS Q1 turns off at t1, the output diode D1 turns off too. It is the output diode D1 turn-off that makes the current in the saturable inductor Ls decrease to zero. It is the reverse voltage and reset current source on the saturable inductor that makes the saturable inductor with volt-sec block capability with time increase.

During t4~t5 time slot, as the output DR2 of function block M steps down to zero, MOS Q2 turns off, and the magnetizing current in the reset winding Nt drops to zero suddenly. Due to the magnetic flux unchanged of the output isolated transformer, the magnetizing current in the reset winding Nt must go through other windings. For the secondary winding Ns, due to the series saturable inductor Ls, the current in the saturable inductor Ls is zero and with block capability. The saturable inductor Ls current can not step up instantaneously. The magnetizing current in the reset winding Nt can not go through the secondary winding Ns. For the primary winding Np, it is connected with the input voltage $V_{IN}$ through the primary MOS Q1. The magnetizing current in the reset winding Nt can go back to the input voltage $V_{IN}$ through the primary winding Np. The magnetizing current in the reset winding Nt through the homonymous end of the primary winding Np is Nt/Np times the reset winding Nt magnetizing current as MOS Q2 turns off. It is the current that comes out from the homonymous end of the primary winding Np that causes the drain voltage of the primary MOS Q1 to drop from the input voltage $V_{IN}$ to zero and MOS Q1's body diode turn on. The magnetizing current in the reset winding Nt feedbacks back to the input voltage $V_{IN}$ through the primary winding Np. It is moment t5 that the voltage on the primary MOS Q1 is zero and the drain current of the primary MOS Q1 is negative. If at t5, DR1 from the function block M is high level for the gate of MOS Q1, the primary MOS Q1 is turned on in ZVS condition.

As MOS Q1 turns on, the output voltage of the secondary winding will apply on the saturable inductor Ls through the output diode D1 and the freewheel diode D2. Due to the reverse voltage and the reset current source, the saturable inductor Ls has already recovered volt-sec block capability. After the time related with the volt-sec block capability, the saturable inductor Ls will be turned on, and the output current from the secondary winding Ns passes to the load through the output diode D1, the saturable inductor Ls and the output inductor L. Regardless of whether the output inductor L current is DCM or CCM, due to the function of the saturable inductor Ls, it provides a short block time that can make sure MOS Q1's drain voltage to drop from the input voltage $V_{IN}$ to zero, and the body diode of MOS Q1 turn-on to feedback the magnetizing current back to the input voltage $V_{IN}$. It can make sure MOS Q1 turn-on occurs in ZVS condition as long as DR1 from the function block M comes right time. In order to decrease the conducting loss on the output diode D1 and the freewheel diode D2, D1 and D2 can be replaced with MOS1 and MOS2 to obtain higher efficiency.

Technical Scheme 3: to compare with technical scheme 1 for DCM operation, the reset winding Nt can be moved from the primary side to the secondary side, and the primary MOS Q1 can still be turned on in ZVS.

Technical Scheme 4: to compare with technical scheme 2 for both CCM and DCM operation, the reset winding Nt can be moved from the primary side to the secondary side, and the primary MOS Q1 can still be turned on in ZVS.

For technical scheme 3, the function block M has two implement schemes (embodiment 4 and embodiment 5).

Embodiment 4

The function block M is on the secondary side of the output isolated transformer, and the implement scheme is the same as embodiment 2 circuit (as shown in FIG. 6). The reset winding Nt, MOS Q2, voltage divider of Ru and Rd as well as the sense resistor Rs are on the secondary side. The voltage on the sense resistor Rs is related with the output inductor current. The output of the voltage divider of Ru and Rd is related with the voltage Vcr on the resonant capacitor Cr. The FB pin of the function block M picks up the output of the voltage divider of Ru and Rd to control MOS Q2 turn-on or off through the function block M. In order to turn-on the primary MOS Q1 in ZVS, there is a function block M1 on the primary side of the output isolated transformer. The output signal from the function block M is transferred to the function block M1 through an isolated pulse transformer or two high voltage small capacitors ζ1 and ζ2. Based on received signal from the function block M, the function block M1 control the primary side MOS Q1 turn-on or off.

Figure 8:
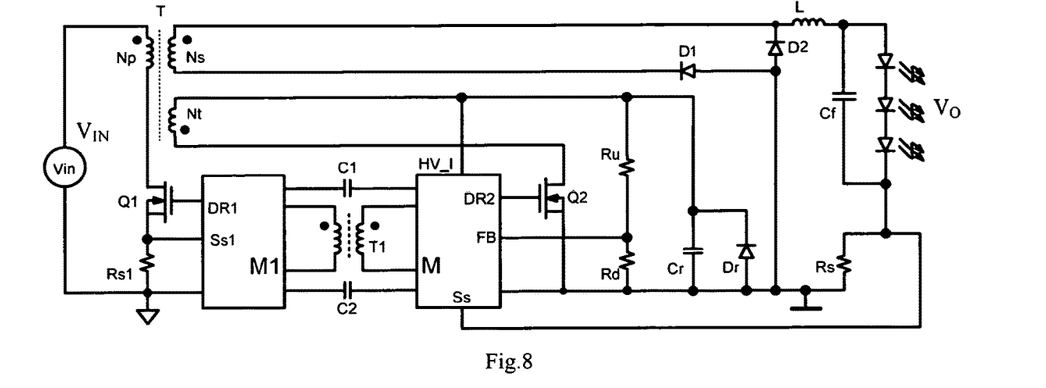
FIG. 8 is a schematic of embodiment 4 for the output inductor L current is in DCM condition. The function block M and the related resonant reset circuit are on the secondary side of the isolated transformer.

As shown in FIG. 8, the connection relation is as following:

Based on the feedback voltage on the sense resistor Rs and the output from the voltage divider of Ru and Rd for the resonant capacitor Cr's voltage Vcr. The function block M receives voltages through Ss and FB input pins of the function block M, and the output DR2 from the function block M controls the gate of MOS Q2. The source of MOS Q2 is connected to the secondary ground. The drain of MOS Q2 is connected with the homonymous end of the reset winding Nt. The non-homonymous end of the reset winding Nt is connected to the secondary ground through the resonant capacitor Cr. A diode Dr is parallel with the resonant capacitor Cr. The anode of the diode Dr is connected with the secondary ground. The output signal from the function block M is transferred into the function block M1 through an isolated pulse transformer or two high voltage small capacitors C1 and C2. The output DR1 of the function block M1 is connected with the gate of the primary side MOS Q1. The source of the primary MOS Q1 is connected into the primary ground through the sense resistor Rs1. The primary MOS Q1's source is connected with Ss1 input pin of the function block M1. The primary MOS Q1's drain is connected with the non-homonymous end of the primary winding Np. The homonymous end of the primary winding Np is connected with the input voltage V. The non-homonymous end of the secondary winding Ns is connected to the secondary ground through the cathode of the output diode D1. The homonymous end of the secondary winding Ns is connected with one terminal of the output inductor L. The homonymous end of the secondary winding Ns is connected to the secondary ground through the cathode of the freewheel diode D2.

Another terminal of the output inductor L is connected with the positive terminal of the filter capacitor Cf and the load voltage Vo. The negative terminal of the filter capacitor Cf is connected with the negative terminal of the load voltage Vo. The negative terminal of the filter capacitor Cf is connected into the secondary ground through the sense resistor Rs. The function block M1 outputs DR1, driving pulse, to control the primary MOS Q1 turn-on.

This is similar with the forward DC-DC converter operation in DCM with the reset winding Nt, MOS Q2 and the function block M on the primary side. There are couple time slots. The primary MOS Q1 is turned off starting at t1.

t1~t2: As MOS Q1 turns off, the drain voltage of MOS Q1 increases rapidly. The voltage on the primary winding Np is decreased from the input DC voltage to zero and reversed. The voltage on the secondary winding Ns is also decreased to zero and reversed. The output diode D1 turns off and the current of the output inductor L keeps to output to the load through the freewheel diode D2. The output load voltage is Vo. The magnetizing current of the primary winding Np is transferred to the reset winding Nt. The input magnetizing current through the homonymous end of the reset winding Nt resonates with the resonant capacitor Cr through MOS Q2's body diode. The initial value of the input magnetizing current through the homonymous end of the reset winding Nt is Np/Nt times the primary winding Np magnetizing current as MOS Q1 turns off. The input magnetizing current through the homonymous end of the reset winding Nt is decreased from the initial value to zero (as shown $I_{RC}$ in FIG. 4) and the voltage $V_{Cr}$ on the resonant capacitor Cr is increased from zero to peak. Based on the voltage from the voltage divider of Ru and Rd, the function block M's pin DR2 outputs a driving pulse to the gate of MOS Q2, and MOS Q2 turns on. Due to MOS Q2's body diode first turn-on, MOS Q2 turns on in ZVS condition. As the resonant current is decreased to zero and the voltage on the resonant capacitor reaches peak (as shown $V_{Cr}$ in FIG. 4), the time is t2.

t2~t3: Due to the driving pulse from the pin DR2 of the function block M to the gate of MOS Q2, MOS Q2 is kept on. The resonant capacitor Cr continues to resonate with the magnetizing inductor Lm of the primary winding Np through MOS Q2 and the reset winding Nt. The magnetizing current in the reset winding Nt is increased from zero to peak (as shown $I_{RC}$ in FIG. 4) and the voltage on the resonant capacitor Cr is decreased to zero (as shown $V_{Cr}$ in FIG. 4) at t3. The voltage on the primary winding is zero. The voltage of drain-source is decreased from over the input DC $V_{IN}$ into the input DC $V_{IN}$.

During the time slot of t1~t3, the output isolated transformer is resonant reset and it is finished at t3, that is, $T_{RESET}$=t3−t1. In order to make sure that the output isolated transformer finishes resonant reset, the turn-off time of the primary MOS Q1 in the forward DC-DC converter must be longer than the resonant reset time $T_{RESET}$.

t3~t4: In t3~t4 time slot, MOS Q2 stays on. The diode Dr parallel with the resonant capacitor Cr is turned on and the voltages on the resonant capacitor and the reset winding Nt are zero (as shown $V_{Cr}$ waveform in FIG. 4). Due to zero voltage on the reset winding Nt, the current in the reset winding stays constant (as shown $I_{RC}$ waveform in FIG. 4) and the drain voltage of the MOS Q1 is equal to the input DC voltage $V_{IN}$ (as shown Vds waveform in FIG. 4). All of these are prepared to make MOS Q1 turn-on in ZVS. This time slot provides a regulated freedom to let the output current with a wide output current regulated range. The forward DC-DC converter operates in DCM, and the current in the output inductor L will decrease to zero before t4.

t4~t5: At moment t4, the output DR2 of function block M will step down to zero. MOS Q2 turns off and the magnetizing current in the reset winding Nt will drop to zero suddenly. The function block M sends the information about DR2 step down to zero to the function block M1 through an isolated pulse transformer or two high voltage small capacitors C1 and C2. Due to the magnetic flux unchanged of the output isolated transformer, the magnetizing current in the reset winding Nt must go through other windings. For the secondary winding Ns, due to DCM, the current in the output inductor is zero and can't step up instantaneously. The magnetizing current in the reset winding Nt can't go through the secondary winding Ns. For the primary winding Np, it is connected with the input voltage $V_{IN}$ through the primary MOS Q1. The magnetizing current in the reset winding Nt can go back to the input voltage $V_{IN}$ through the primary winding Np. The magnetizing current in the reset winding Nt through the homonymous end of the primary winding Np is Nt/Np times the reset winding Nt magnetizing current as MOS Q2 turns off. It is the current out from the homonymous end of the primary winding Np that causes the drain voltage of the primary MOS Q1 to drop from the input voltage $V_{IN}$ to zero and MOS Q1's body diode to turn on (as shown $I_{RS}$ waveform in FIG. 4). The magnetizing current in the reset winding Nt feedbacks to the input voltage $V_{IN}$ through the primary winding Np. It is moment t5 when the voltage on the primary MOS Q1 is zero and the drain current of the primary MOS Q1 is negative.

At moment t4, based on the information received about DR2 from the function block M, the function block M1 generates a delay time ζ1. During the delay time ζ1, the function block M1 checks when the voltage on the sense resistor Rs1 is negative. When the voltage on Rs1 is negative, it means the body diode of MOS Q1 turns on, and the function block M1 outputs DR1 in a high level to turn on MOS Q1 in ZVS at t5. If the voltage on Rs1 is over zero, it means that during delay time ζ1 slot, the generated magnetizing current in winding Np due to MOS Q2 turn-off is not high enough to discharge the drain capacitance voltage from the input voltage $V_{IN}$ drop to zero, and make the body diode of MOS Q1 turn-on. In this case, the voltage between the drain and source of the MOS Q1 is over zero. After ζ1 time slot, the DR1 of the function block M1 will be a high level to turn on the primary MOS Q1 in hard switching condition at moment t0.

t0~t1: During t0~t1 time slot, due to the primary MOS Q1 turn-on, the current in the homonymous end of the primary winding Np is changed from negative to positive and increased linearly. The function block M detects the voltage on the sense resistor Rs. As the voltage on the sense resistor Rs is over the preset level, it means that the current in the output inductor L reaches the preset peak. The function block M sends the information about the current in the output inductor L over the preset peak to the function block M1 through an isolated pulse transformer or two high voltage small capacitors C1 and C2 and asks the function block M1 to turn off the primary MOS Q1. Based on the received requirement, the function block M1 will control the primary MOS Q1 to turn off. The whole system is in t1~t2 time slot and into next switching cycle.

In FIG. 8, in order to decrease the conducting loss on the output diode D1 and the freewheel diode D2, D1 and D2 can be replaced with MOS1 and MOS2 to get higher efficiency. Based on the slope information of the current in the output inductor L, the function block M can output driving pulses for gates of MOS1 and MOS2 by synchronizing rectifier function. For further details, as the slope of the current in the output inductor L is positive, MOS1 turns on; as the slope of the current in the output inductor L is negative, MOS2 turns on; as the voltage on the sense resistor Rs is zero, both MOS1 and MOS2 turn off.

Embodiment 5

Figure 9:
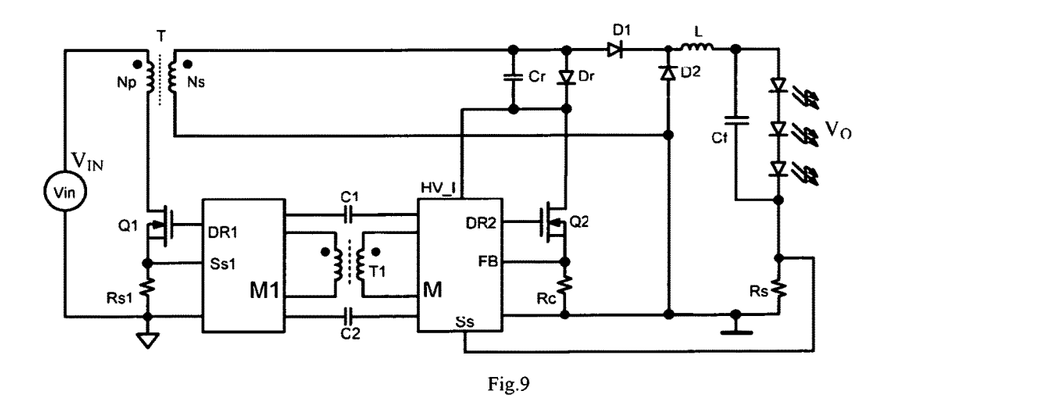
FIG. 9 is a schematic of embodiment 5 for the output inductor L current is in DCM condition. The function block M and the related resonant reset circuit are on the secondary side of the isolated transformer.

To compare with embodiment 4, if MOS1 and MOS2 do not need to replace the output diode D1 and the freewheel diode D2, the circuit shown in FIG. 8 can be simplified as shown in FIG. 9. The reset winding Nt can be saved, and the secondary winding Ns is used for resonant reset function.

In comparison with embodiment 1, the function block M, MOS Q2, sense resistors Rc and Rs are all on the secondary side in embodiment 5. The voltage on the sense resistor Rs is reflected as the current in the output inductor L. The voltage on the sense resistor Rc is reflected as the resonant current in the secondary winding Ns. The function block M's FB and Ss input pins pick up the feedback voltages on Rc and Rs. Based on the feedback voltages, the function block M controls MOS Q2 turn-on or off. The output signal from the function block M is transferred to the function block M1 through an isolated pulse transformer or two high voltage small capacitors C1 and C2. Based on the received signal from the function block M, the function block M1 controls the primary MOS Q1 turn-on or off.

FIG. 9 shows the connection relationship for the embodiment 5 implementation circuit:

Based on the feedback voltages on Rs and Rc through input pins Ss and FB of the function block M, the output DR2 from the function block M controls the gate voltage of MOS Q2. The source of Q2 is connected to the secondary ground through the sense resistor Rc. The drain of MOS Q2 is connected with the homonymous end of the secondary winding Ns through the resonant capacitor Cr. The non-homonymous end of the secondary winding Ns is connected with the secondary ground. The diode Dr is parallel with the resonant capacitor Cr. The anode of the diode Dr is connected with the homonymous end of the secondary winding Ns. The output signal from the function block M is transferred to the function block M1 through an isolated pulse transformer or two high voltage small capacitors C1 and C2. The output DR1 of the function block M1 is connected with the gate of the primary MOS Q1. The source of the primary MOS Q1 is connected to the primary ground through the sense resistor Rs1. The primary MOS Q1's source is connected with the input pin Ss1 of the function block M1. The drain of the primary MOS Q1 is connected with the non-homonymous end of the primary winding Np. The homonymous end of the primary winding Np is connected with the input voltage V. The homonymous end of the secondary winding Ns is connected with the anode of the output diode D1. The cathode of the output diode D1 is connected with the cathode of the freewheel diode D2 and one terminal of the output inductor L. The other terminal of the output inductor L is connected with one terminals of the filter capacitor Cf and the load voltage. The anode of the freewheel diode D2 is connected with the secondary ground. The other terminals of the filter capacitor Cf and the load voltage are connected to the secondary ground through the sense resistor Rs. Based on the received signal from the function block M and the feedback voltage on the sense resistor Rs1, the output Dr1 of the function block M1 controls the primary MOS Q1 turn on or off in ZVS.

Similarly to previous forward DC-DC converter operation in DCM, there are several time slots. Start at t1, that is, the primary MOS Q1 is just turned off:

t1~t2: As MOS Q1 turns off, the drain voltage of MOS Q1 increases rapidly. The voltage on the primary winding Np is decreased from the input DC voltage $V_{IN}$ to zero and reversed. The voltage on the secondary winding Ns is also decreased to zero and reversed. The output diode D1 turns off, and the current of the output inductor L keeps to output to the load through the freewheel diode D2. The output load voltage is Vo. The magnetizing current of the primary winding Np is transferred to the secondary winding Ns. The input magnetizing current through the homonymous end of the secondary winding Ns resonates with the resonant capacitor Cr through MOS Q2's body diode and the sense resistor Rc. The initial value of the input magnetizing current through the homonymous end of the secondary winding Ns is Np/Ns times the primary winding Np magnetizing current as MOS Q1 turns off. The input magnetizing current through the homonymous end of the secondary winding Ns is decreased from the initial value to zero (as shown $I_{RC}$ in FIG. 4) and the voltage $V_{Cr}$ on the resonant capacitor Cr is increased from zero to peak. Based on the voltage on the sense resistor Rc, the function block M's pin DR2 outputs a driving pulse to the gate of MOS Q2, and MOS Q2 turns on. Due to MOS Q2's body diode turn-on first, MOS Q2 turns on in ZVS condition. As the resonant current is decreased to zero, the voltage on the resonant capacitor reaches peak (as shown $V_{Cr}$ in FIG. 4) at t2.

t2~t3: The voltage on the secondary winding Ns remains reversed, and the output diode D1 turns off. Due to the driving pulse from the pin DR2 of the function block M to the gate of MOS Q2, MOS Q2 is kept on. The resonant capacitor Cr continues to resonate with the magnetizing inductor Lm of the primary winding Np through MOS Q2 and the secondary winding Ns. The magnetizing current in the secondary winding Ns is increased from zero to peak (as shown $I_{RC}$ in FIG. 4) and the voltage $V_{Cr}$ on the resonant capacitor Cr is decreased to zero (as shown $V_{Cr}$ in FIG. 4) at t3. The voltage on the sense resistor Rc is a positive voltage reflected with a magnetizing current. The voltage on the primary winding is zero. The voltage of drain-source is decreased from over the input DC $V_{IN}$ to input DC $V_{IN}$.

During the time slot of t1~t3, the output isolated transformer is resonant reset and it is finished at t3, that is, $T_{RESET}$=t3−t1. In order to make sure that the output isolated transformer finishes resonant reset, the turn-off time of the primary MOS Q1 in the forward DC-DC converter must be longer than the resonant reset time $T_{RESET}$.

t3~t4: In t3~t4 time slot, MOS Q2 continues to be on. The diode Dr parallel with the resonant capacitor Cr is turned on and the voltages on the resonant capacitor and the secondary winding Ns are zero (as shown $V_{Cr}$ waveform in FIG. 4). Due to zero voltage on the secondary winding Ns, the current in the secondary winding remains constant (as shown $I_{RC}$ waveform in FIG. 4) and the drain voltage of the MOS Q1 is equal to the input DC voltage $V_{IN}$ (as shown Vds waveform in FIG. 4). All of these are prepared to make MOS Q1 turn-on in ZVS. This time slot provides a regulated freedom to let the output current with a wide output current regulated range. The forward DC-DC converter operates in DCM, and the current of the output inductor decays to zero before t4.

t4~t5: At moment t4, the output DR2 of function block M steps down to zero. MOS Q2 turns off and the magnetizing current in the secondary winding Ns drops to zero suddenly. The function block M sends the information about DR2 stepping down to zero to the function block M1 through an isolated pulse transformer or two high voltage small capacitors C1 and C2. Due to the magnetic flux unchanged of the output isolated transformer, the magnetizing current in the secondary winding Ns must go through other windings. For the secondary winding Ns, due to DCM, the current in the output inductor L is zero and cannot step up instantaneously. The magnetizing current in the secondary winding Ns cannot go through the secondary winding Ns. For the primary winding Np, it is connected with the input voltage $V_{IN}$ through the primary MOS Q1. The magnetizing current in the secondary winding Ns can go back to the input voltage $V_{IN}$ through the primary winding Np. The magnetizing current in the secondary winding Ns through the homonymous end of the primary winding Np is Ns/Np times the secondary winding Ns magnetizing current as MOS Q2 turns off. It is the current out from the homonymous end of the primary winding Np that causes the drain voltage of the primary MOS Q1 to drop from the input voltage $V_{IN}$ to zero and MOS Q1's body diode turn on (as shown $I_{RS}$ waveform in FIG. 4). The magnetizing current in the secondary winding Ns feedbacks to the input voltage $V_{IN}$ through the primary winding Np. It is moment t5 when the voltage on the primary MOS Q1 is zero and the drain current of the primary MOS Q1 is negative.

At moment t4, based on the received information about DR2 from the function block M, the function block M1 generates a delay time $\zeta 1$. During the delay time $\zeta 1$, the function block M1 checks when the voltage on the sense resistor Rs1 is negative. As the voltage on Rs1 is negative, it means the body diode of MOS Q1 turns on and the function block M1's output DR1 can be in high level to turn on MOS Q1 in ZVS at t5. If the voltage on Rs1 is over zero, it means that during delay time $\zeta 1$ slot, the generated negative magnetizing current in winding Np isn't high enough to discharge the drain voltage of MOS Q1 from the input voltage $V_{IN}$ drop to zero, due to MOS Q2 turn-off. Subsequently, the body diode of MOS Q1 cannot turn-on. In this case, the drain voltage of the MOS Q1 is over zero. After $\zeta 1$ time slot, the DR1 of the function block M1 will be high level to turn on the primary MOS Q1 in hard switching condition at t0 moment.

t0~t1: During t0~t1 time slot, due to the primary MOS Q1 turn-on, the current in the homonymous end of the primary winding Np is changed from negative to positive and increased linearly. The function block M detects the voltage on the sense resistor Rs. As the voltage on the sense resistor Rs is over the preset level, it means that the current in the output inductor L has reached the preset peak. The function block M sends the information about the current in the output inductor L over the preset peak to the function block M1 through an isolated pulse transformer or two high voltage small capacitors C1 and C2, and ask the function block M1 to turn off the primary MOS Q1. Based on the received requirement, the function block M1 controls the primary MOS Q1 to turn off. The whole system is in t1~t2 time slot and proceeds to next switching cycle.

For technical scheme 4, there are two embodiments (embodiment 6 and embodiment 7).

Embodiment 6

Figure 10:
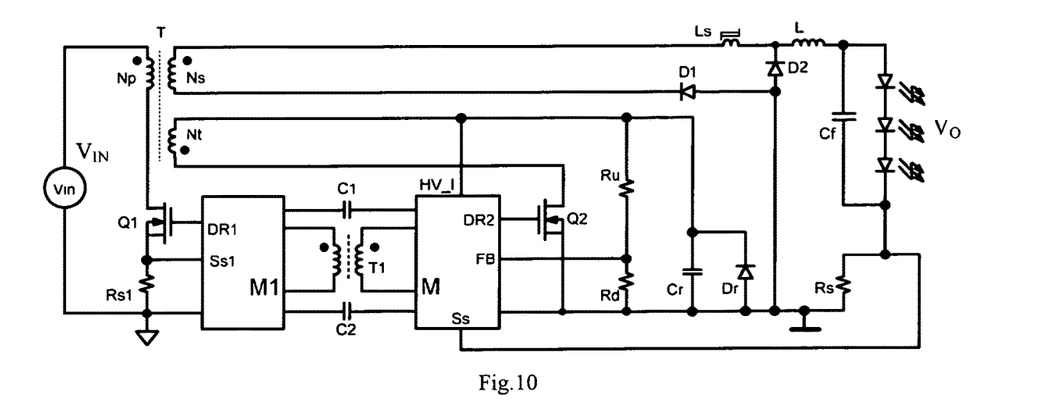
FIG. 10 is a schematic of embodiment 6 for the output inductor L current is in both CCM and DCM conditions. The function block M and the related resonant reset circuit are on the secondary side of the isolated transformer.

For technical scheme 4, the forward DC-DC converter operation in both DCM and CCM, it needs to add a device that is a saturable inductor Ls. This saturable inductor Ls makes sure the primary MOS Q1 turn on in ZVS for the current in the output inductor L in both DCM and CCM. To compare with FIG. 8, a saturable inductor Ls is inserted between the homonymous end of the secondary winding Ns and one the output inductor L's terminal which is connected with the cathode of the freewheel diode D2 as shown in FIG. 10. The function block M, the reset winding Nt, MOS Q2, voltage divider of Ru and Rd as well as the sense resistor Rs are on the secondary side.

Under the forward DC-DC converter operation in CCM condition, at moment t1, due to the primary MOS Q1 turn-off, the output voltage of the secondary winding Ns is reversed, and the output diode D1 turns off. It is the output diode D1 turn-off that causes the current in the saturable inductor drop to zero. It is the reverse voltage and the reset current source for the saturable inductor. The saturable inductor Ls recovers volt-sec block capability during t1~t3 time slot.

t4~t5: At moment t4, the output DR2 of function block M is step down to zero. MOS Q2 turns off and the magnetizing current in the reset winding Nt drops to zero suddenly. The function block M sends the information about DR2 stepping down to zero to the function block M1 through an isolated pulse transformer or two high voltage small capacitors C1 and C2. Since the magnetic flux of the output isolated transformer is unchanged, the magnetizing current in the reset winding Nt must go through other windings. The secondary winding Ns cannot step up instantaneously because the current in the series saturable inductor Ls is zero. The magnetizing current in the reset winding Nt cannot go through the secondary winding Ns. For the primary winding Np, it is connected with the input voltage $V_{IN}$ through the primary MOS Q1. The magnetizing current in the reset winding Nt can go back to the input voltage $V_{IN}$ through the primary winding Np. The magnetizing current in the reset winding Nt through the homonymous end of the primary winding Np is Nt/Np times the reset winding Nt magnetizing current as MOS Q2 turns off. It is the current out from the homonymous end of the primary winding Np that causes the drain voltage of the primary MOS Q1 to drop from the input voltage $V_{IN}$ to zero and MOS Q1's body diode turn on (as shown $I_{RS}$ waveform in FIG. 4). The magnetizing current in the reset winding Nt feedbacks to the input voltage $V_{IN}$ through the primary winding Np. It is moment t5 when the voltage on the primary MOS Q1 is zero and the drain current of the primary MOS Q1 is negative. As long as the function block M1 outputs DR1 in high level, and it can make MOS Q1 turn on in ZVS.

As the primary MOS Q1 turns on, the output voltage of the secondary winding Ns will apply to the saturable inductor Ls through the output diode D1 and the freewheel diode D2. It needs time related with volt-sec due to the reverse voltage and the reset current source on the saturable inductor Ls; as a result, the saturable inductor Ls is turned on. The output current from the secondary winding Ns is transferred to the load through the output diode D1, the saturable inductor Ls and the output inductor L. Regardless of whether the current in the output inductor L is in DCM or CCM, the function of the saturable inductor Ls is to provide short block time and to make sure that the drain voltage of the primary MOS Q1 can drop down from the input voltage $V_{IN}$ to zero and MOS Q1's body diode turn on. The magnetizing current in the reset winding Nt feedbacks to the input voltage $V_{IN}$ through the primary winding Np. In order to obtain higher efficiency, D1 and D2 can be replaced with MOS1 and MOS2, and the function block M can offer driving pulses for MOS1 and MOS2.

Embodiment 7

Figure 11:
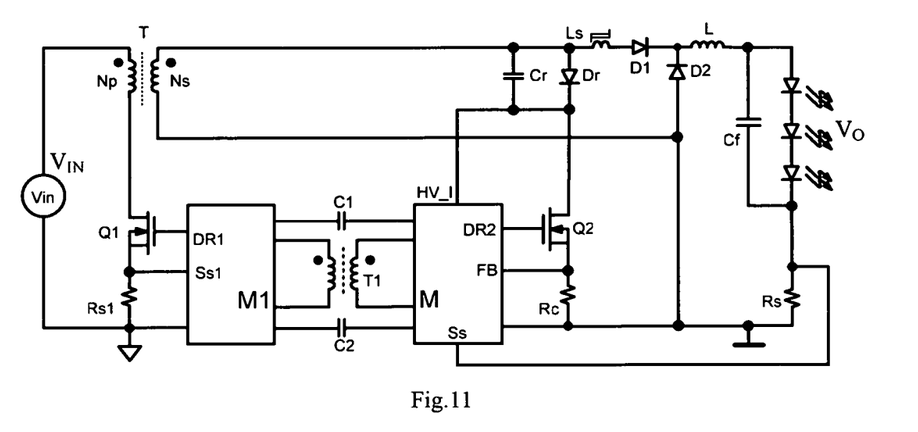
FIG. 11 is a schematic of embodiment 7 for the output inductor L current is in both CCM and DCM conditions. The function block M and the related resonant reset circuit are on the secondary side of the isolated transformer.

For technical scheme 4, the forward DC-DC converter operates in both DCM and CCM. If D1 and D2 are not replaced with MOS1 and MOS2, the reset winding Nt can be saved. The secondary winding Ns can be used to finish the resonant reset. To compare with FIG. 9, a device, specifically a saturable inductor Ls, needs to be added. It is the saturable inductor Ls that makes sure the primary MOS Q1 will turn on in ZVS for the current of the output inductor L in both DCM and CCM. As shown in FIG. 11, a saturable inductor Ls is inserted between the homonymous end of the secondary winding Ns and the anode of the output diode D1.

Under the forward DC-DC converter operation in CCM condition, at moment t1, due to the primary MOS Q1 turn-off, the output voltage of the secondary winding Ns is reversed, and the output diode D1 turns off. It is the output diode D1 turn-off that makes the current in the saturable inductor drop to zero. It is the reverse voltage and the reset current source on the saturable inductor. The saturable inductor Ls recovers volt-sec block capability during t1~t3 time slot.

At moment t4, the output DR2 of function block M steps down to zero. MOS Q2 turns off and the magnetizing current in the secondary winding Ns drops to zero suddenly. The function block M sends the information about DR2 step down to zero to the function block M1 through an isolated pulse transformer or two high voltage small capacitors C1 and C2. Since the magnetic flux of the output isolated transformer remains unchanged, the magnetizing current in the secondary winding Ns must go through other windings. The secondary winding Ns cannot step up instantaneously because the current in the series saturable inductor Ls is zero. The magnetizing current in the secondary winding Ns cannot go through the secondary winding Ns. For the primary winding Np, it is connected with the input voltage $V_{IN}$ through the primary MOS Q1. The magnetizing current in the secondary winding Ns can go back to the input voltage $V_{IN}$ through the primary winding Np. The magnetizing current in the secondary winding Ns through the homonymous end of the primary winding Np is Ns/Np times the secondary winding Ns magnetizing current as MOS Q2 turns off. It is the current out from the homonymous end of the primary winding Np that causes the drain voltage of the primary MOS Q1 to drop from the input voltage $V_{IN}$ to zero and MOS Q1's body diode turn on. The magnetizing current in the secondary winding Ns can feedback to the input voltage $V_{IN}$ through the primary winding Np. It is moment t5 that the voltage on the primary MOS Q1 is zero and the drain current of the primary MOS Q1 is negative. As long as the output DR1 from the function block M1 is in high level for the gate of MOS Q1, the primary MOS Q1 is turned on in ZVS condition.

As the primary MOS Q1 turns on, the output voltage of the secondary winding Ns will be applied onto the saturable inductor Ls through the output diode D1 and the freewheel diode D2. It needs time related with volt-sec due to the reverse voltage and the reset current source on the saturable inductor Ls in order for the saturable inductor Ls to turn on. The output current from the secondary winding Ns is transferred to the load through the output diode D1, the saturable inductor Ls and the output inductor L. Regardless of whether the current in the output inductor L is in DCM or CCM, the function of the saturable inductor Ls is to provide short block time and to make sure that the drain voltage of the primary MOS Q1 can drop down from the input voltage $V_{IN}$ to zero and MOS Q1's body diode turn on. The magnetizing current can feedback to the input voltage $V_{IN}$ through the primary winding Np.

Besides controlling MOS Q2 to finish the resonant reset for the forward output isolated transformer, the function block M is to control the output current based on the feedback voltage on the sense resistor Rs and preset control algorithm. The feedback voltage on the sense resistor Rs offers a lot of information about when the current in the output inductor L reaches the preset peak and when the current is down to zero. Based on all information, the function block M sends related signals to the function block M1 through an isolated pulse transformer or two high voltage small capacitors C1 and C2. Based on the received signal, the function block M1 controls the primary MOS Q1 turn-on or off. The function block M also detects the output load voltage and controls the output load voltage in allowed range.

In FIGS. 8, 9, 10 and 11, function block M1 not only processes the requirement from the function block M and to control the primary MOS Q1 on or off, but also start the whole system in initial. As shown in FIG. 11, the function block M is on the secondary side. Before the whole system is started up, the function block M's operation voltage is zero and does not have any control function.

At initial, from the input voltage $V_{IN}$, the function block M1 generates initial driving pulse to make the primary MOS Q1 turn on and off. It is the primary MOS Q1 turn-on or off that generates the pulse voltage on the secondary winding Ns or the reset winding Nt. The input HV_I pin of the function block M picks up energy from the voltage on the secondary or reset windings to set up the operation voltage for the function block M. In this way, as the function block M's operation voltage is set up, the function block M has all required control function. The output power from the secondary or reset windings with the function block M1 control is lower and is controlled by the value of the sense resistor Rs1. When the function block M is with all required control function, the function block M can send a signal to the function block M1 though an isolated pulse transformer or two high voltage small capacitors C1 and C2. As the function block M1 receives the transferred signal, and the function block M1 stops the initial start function. The output power is fully controlled with the function block M on the secondary side.

Based on above the operation concept and seven embodiments, it is possible to give more combination embodiments. All of embodiments based on the operation concept should be covered with the invention.

What is claimed is:

1. A forward DC-DC ZVS converter comprising:
a function block, an output isolated transformer, and a related forward DC-DC converter;
wherein the output isolated transformer comprises a primary winding, a secondary winding, and a reset winding in tight couple through a magnetizing core; and the output isolated transformer comprises a magnetizing inductor; wherein the inductance value of the related magnetizing inductor is changed with turns-ratio square of the output isolated transformer; and two terminals of the secondary winding Ns are connected with the cathodes of the output diode D1 and the freewheel diode D2 separately; and the anodes of the output diode and the freewheel diode are connected together with negative terminals of an output filter capacitor Cf and the load; and the cathode of the freewheel diode is connected with one terminal of an output inductor, and the other terminal of the output inductor is connected with the positive terminals of output filter capacitor and the load;
wherein a first pin of the function block M is connected with a gate of a primary MOSFET; and a second pin of the function block M is connected with a gate of a second MOSFET; and a third pin of the function block M is connected with a source of the second MOSFET and ground; and a source of the primary MOSFET is connected through the sense resistor into ground; and the reset winding Nt and a resonant capacitor with a parallel diode are connected with the related pins of the function block;

wherein the function block comprises two parts, one part of the divided function block is configured to control the on or off of the primary MOSFET turn; and the other part of the divided function block is configured to control the on or off of the second MOSFET; and based on the current of the reset winding or the voltage of the resonant capacitor, feedback signal, the function block M is configured to control the resonant reset through control the on or off of the resonant reset second MOSFET;

wherein $V_{IN}$ is a primary side input DC voltage; and $V_{IN}$ is connected with the homonymous end primary winding of the output isolated transformer; and the non-homonymous end primary winding of the output isolated transformer is connected with the drain of the first MOSFET.

2. The forward DC-DC ZVS converter of claim 1, wherein the function block, there are a resettable integrator, comparator+limited amplitude error amplifier, cross zero+delay module; and the source of the second MOSFET is connected to ground through the sense resistor Rc; and the homonymous end reset winding of the output isolated transformer is connected with the drain of second MOSFET and the non-homonymous end reset winding of the output isolated transformer is connected to ground through the resonant capacitor; and the diode is parallel with the resonant capacitor, and the anode of the diode is connected with ground; and the output of the comparator+limited amplitude error amplifier module is connected with the gate of the second MOSFET; and the sense voltage on the sense resistor Rc is used as an input signal for the resettable integrator and the comparator+limited amplitude error amplifier module; and the output of the resettable integrator is as an input for the comparator+limited amplitude error amplifier module and the cross zero+delay module; and the output of the cross zero+delay module is another input of the comparator+limited error amplifier module.

3. The forward DC-DC ZVS converter of claim 1, wherein the function block is composed of compare+limited amplitude error amplifier and zero cross+delay module; and the source of the second MOSFET is in ground; and the drain of the second MOSFET is connected with the homonymous end reset winding of the output isolated transformer; and the non-homonymous end reset winding of the output isolated transformer is connected to ground through the resonant capacitor; and the diode is parallel with the resonant capacitor; and the anode of the parallel diode is in ground; and the output of compare+limited amplitude error amplifier is connected with the gate of the second MOSFET; and the voltage on the resonant capacitor is output through voltage divider network; and the voltage divider is composed of Ru and Rd; and the output of the voltage divider is as an input signal for compare+limited amplitude error amplifier and zero cross+delay module; and the output of zero cross+delay module is another input for the compare+limited amplitude error amplifier.

4. The forward DC-DC ZVS converter of claim 1, wherein the resonant reset with the reset winding can be in the primary side of the output isolated transformer to make the primary MOSFET turn-on in ZVS; and the resonant reset with the reset winding also can be in the secondary side of the output isolated transformer to make the primary MOSFET turn-on in ZVS with an additional function block M1.

5. The forward DC-DC ZVS converter of claim 1, wherein the reset winding and the second MOSFET are used to finish the resonant reset for the output isolated transformer and make the primary MOSFET turn-on in ZVS to decrease the switching loss; and based on the current or voltage of the resonant reset, the function block controls the on or off of the second MOSFET to make the output isolated transformer resonant reset and the primary MOSFET turn-on in ZVS to down switching loss; and as the second MOSFET turns on, the resonant capacitor is reflected into the primary winding of the output isolated transformer through the reset winding and resonated with the magnetizing inductor Lm of the primary winding; and as the resonant reset is finished, the current in the reset winding reaches reverse peak of magnetizing current; and as the function block controls the second MOSFET turn-off, the reverse magnetizing current in the reset winding is automatically transferred into the primary winding; and as long as the reverse magnetizing current is high enough, the reverse magnetizing current can discharge the drain capacitance voltage of the primary MOSFET from the input voltage $V_{IN}$ to zero and make the body diode of the primary MOSFET turn on to feedback the magnetizing energy into the input DC voltage $V_{IN}$; and at this moment, the function block controls the primary MOSFET turn-on; and due to the body diode of the primary MOSFET turn-on, the primary MOSFET is turned on in ZVS condition with lower switching loss.

* * * * *